US010035375B1

(12) United States Patent
Gifford

(10) Patent No.: US 10,035,375 B1
(45) Date of Patent: Jul. 31, 2018

(54) METHOD AND APPARATUS FOR DISPLAY OF ANIMAL SKULL

(71) Applicant: Charles L Gifford, Camanche, IA (US)

(72) Inventor: Charles L Gifford, Camanche, IA (US)

( * ) Notice: Subject to any disclaimer, the term of this patent is extended or adjusted under 35 U.S.C. 154(b) by 0 days.

(21) Appl. No.: 15/156,325

(22) Filed: May 16, 2016

Related U.S. Application Data

(60) Provisional application No. 62/161,360, filed on May 14, 2015.

(51) Int. Cl.

| | |
|---|---|
| ***F16L 3/00*** | (2006.01) |
| ***B44C 5/02*** | (2006.01) |
| ***F16M 11/22*** | (2006.01) |
| ***F16M 11/04*** | (2006.01) |
| ***A47G 33/00*** | (2006.01) |

(52) U.S. Cl.
CPC .............. *B44C 5/02* (2013.01); *A47G 33/004* (2013.01); *F16M 11/04* (2013.01); *F16M 11/22* (2013.01)

(58) Field of Classification Search
CPC ........ B44C 5/02; A47G 33/004; F16M 11/04; F16M 11/22
USPC ................ 248/121; D11/135; 428/16, 542.4, 428/913.3; 434/296; 473/583
See application file for complete search history.

(56) References Cited

U.S. PATENT DOCUMENTS

| | | | | |
|---|---|---|---|---|
| 2,003,896 A | | 6/1935 | Menger | |
| D247,504 S | * | 3/1978 | Trinkle | D22/115 |
| 4,210,330 A | * | 7/1980 | Kosbab | F42B 6/08 473/584 |
| 4,464,440 A | | 8/1984 | Dotzman | |
| 4,775,323 A | | 10/1988 | Johnson | |
| 4,971,865 A | | 11/1990 | Nowlan | |
| 6,828,035 B1 | | 12/2004 | Goettl | |
| 6,997,827 B1 | * | 2/2006 | Grace, Jr. | F42B 6/08 473/583 |
| 7,207,535 B1 | * | 4/2007 | Giuliani | A01M 31/06 248/216.1 |
| 7,243,888 B2 | * | 7/2007 | Peek | G09B 23/36 248/304 |
| D550,119 S | | 9/2007 | Wynne et al. | |
| D608,686 S | | 1/2010 | St. Ama | |
| 8,157,234 B2 | | 4/2012 | Powell et al. | |
| 8,201,793 B1 | | 6/2012 | Powell et al. | |
| D668,732 S | * | 10/2012 | Frecka | D22/115 |
| 8,336,855 B2 | | 12/2012 | Griffiths | |
| 8,517,741 B1 | | 8/2013 | McLean | |
| 8,758,023 B2 | | 6/2014 | Bittner | |
| D770,937 S | * | 11/2016 | Delgrosso | D11/135 |

(Continued)

OTHER PUBLICATIONS

Classic Antler Mounts; Apr. 7, 2015; Retrieved from Classic Antler Mounts LLC website: http://classicantlermounts.com/panels.php.

*Primary Examiner* — Gwendolyn W Baxter
(74) *Attorney, Agent, or Firm* — Hamilton IP Law, PC; Jay R. Hamilton; Charles Damschen

(57) ABSTRACT

An illustrative embodiment of a skull stand may include a tab positioned proximate the mounting edge to secure the skull to the skull stand. An illustrative embodiment of the skull stand may be configured to provide the user with increased enjoyment and pleasure in displaying the animal skull and/or antlers collected during hunting via the animal skull stand selected to emulate or replicate the particular arrow used for hunting the animal to be displayed.

13 Claims, 12 Drawing Sheets

(56) References Cited

U.S. PATENT DOCUMENTS

| | | | | |
|---|---|---|---|---|
| 9,626,881 | B1 * | 4/2017 | Herron | G09B 23/36 |
| 2006/0154224 | A1 | 7/2006 | St.Ama | |
| 2014/0371010 | A1 * | 12/2014 | Priore | F42B 6/08<br>473/583 |

* cited by examiner

METHOD AND APPARATUS FOR DISPLAY OF ANIMAL SKULL

CROSS REFERENCE TO RELATED APPLICATIONS

This application claims the filing benefit of provisional U.S. Pat. App. No. 62/161,360 filed on May 14, 2015, which is incorporated by reference herein in its entirety.

STATEMENT REGARDING FEDERALLY SPONSORED RESEARCH OR DEVELOPMENT

No federal funds were used to create or develop the invention herein.

REFERENCE TO SEQUENCE LISTING, A TABLE, OR A COMPUTER PROGRAM LISTING COMPACT DISK APPENDIX

N/A

AUTHORIZATION PURSUANT TO 37 C.F.R. § 1.171 (d)(c)

A portion of the disclosure of this patent document may contain material that is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever.

BRIEF DESCRIPTION OF THE DRAWINGS

The accompanying drawings, which are incorporated in and constitute a part of this specification, illustrate embodiments and together with the description, serve to explain the principles of the animal skull stand 10. As used herein, the animal skull 1 may include antlers or horns 2, or be mounted without antlers or horns, without departure from the present disclosure.

FIG. 5B is a right side perspective view of the animal skull stand 10 of the present disclosure shown having a threaded end.

Figure 1:
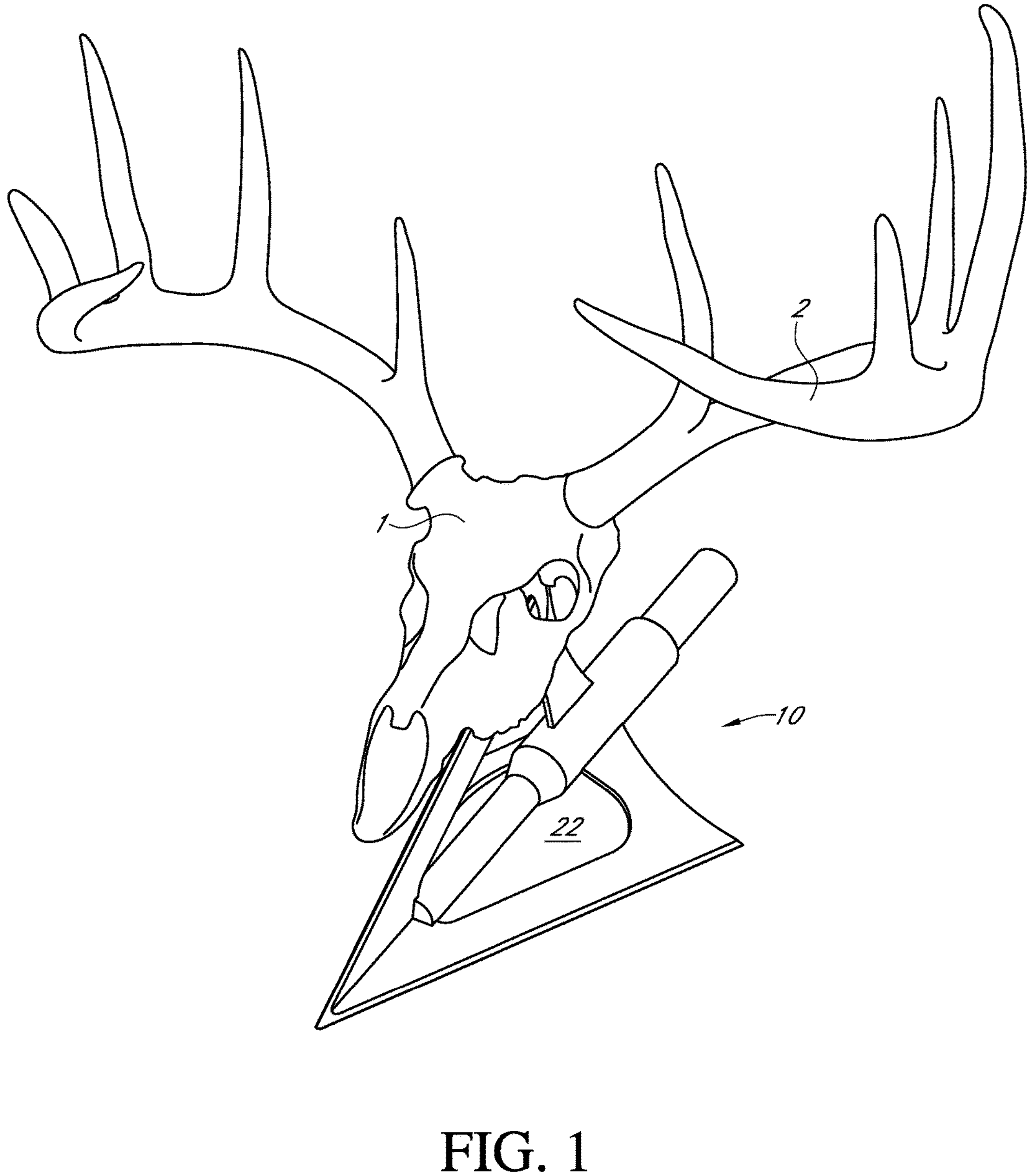
FIG. 1 provides a front view of one illustrative embodiment of an animal skull stand 10 herein the animal skull 1 is that of an elk.

Appendix A is included herein and includes an exemplary listing of various broadheads, field and game points which may be used in the implementation of the present disclosure and is fully incorporated by reference herein.

Appendix B provides additional views of the present disclosure without an animal skull mounted thereon and drawings useful as guides for fabrication to fully enable the present disclosure including dimensions of the representative broadhead 30 and the animal skull stand 10 and its components therein.

DETAILED DESCRIPTION—ELEMENT LISTING

| Description | Element No. |
|---|---|
| Common point - intersection of first end of mounting edge and support edges | A |
| $2^{nd}$ end of Mounting Edge | B |
| $2^{nd}$ end of $1^{st}$ Support Edge | C |
| $2^{nd}$ end of $2^{nd}$ Support Edge | D |
| Skull | 1 |
| Skull connection point (rear) | 1a |
| Antlers | 2 |
| Face | 3 |
| Jawline (Upper) | 4 |
| Roof of Mouth | 5 |
| Teeth | 6 |
| Stand | 10 |
| Tab | 11 |
| Fastener | 12 |
| Mounting edge | 15 |
| Back edge | 17 |
| Center body | 18 |
| Ornamental tail (threaded end) | 19 |
| Support edge | 20 |
| Tab attachment to stand | 21a |
| Tab attachment to skull | 21b |
| Arrowhead (broadhead, field or game point) | 30 |
| Blades | 31 |
| Tip | 32 |
| Center | 33 |
| Tail | 34 |
| Connection point | 35 |
| Back edge | 36 |
| Surface | 40 |

-continued

| Description | Element No. |
|---|---|
| Consumer Input | 101 |
| User Interface | 102 |
| Data | 103 |
| Database | 104 |
| Server | 105 |
| Configurator | 106 |
| Production Order | 107 |
| Suggestions | 108 |
| Order Fulfillment Facility | 109 |
| Stand Customization System | 110 |
| System Suggestions | 111 |
| Selected Stand | 112 |
| Assessment | 113 |
| | 114 |
| Type of Mount | 115 |
| Animal | 116 |
| | 117 |
| Evaluator/Predictor Module | 118 |
| | 119 |
| Produced Stand | 120 |

DETAILED DESCRIPTION

Before the present animal skull stand 10 is disclosed and described, it is to be understood that the skull stand 10 is not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed skull stand 10 and method of displaying an animal skull 1. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all skull stand 10. This applies to all aspects of this application including, but not limited to, components of a skull stand 10. Thus, if there are a variety of additional components that can be added it is understood that each of these additional components can be added with any specific embodiment or combination of embodiments of the disclosed skull stand 10.

The present skull stand 10 may be understood more readily by reference to the following detailed description of preferred embodiments and the examples included therein and to the Figures and their previous and following description. In one embodiment, the skull stand 10 may be constructed of the same or similar material to that of the broadhead, field or game point (collectively referred to as "arrowheads" throughout the present disclosure) used to kill the animal from which the skull 1 was taken to be mounted which are typically constructed from high quality steel or composite materials. See FIG. 6 and Appendix A for exemplary embodiments of arrowheads 30 which may be adapted for use as a skull stand 10 and method of displaying an animal skull 1.

By way of background, an arrowhead is a tip, usually sharpened, added to an arrow to make it more deadly or to fulfill some special purpose. (not shown) The earliest arrowheads were made of stone and of organic materials; as human civilization progressed other materials were used. Arrowheads are important archaeological artifacts; they are a subclass of projectile points. Modern archery and hunting enthusiasts still "produce over one million brand-new spear and arrow points per year."[1]

[1]Kelley, Kevin (2010). *What Technology Wants*. New York: Viking. p. 55. ISBN 978-0-670-02215-1.

Broadheads were used for war and are still used for hunting. Information on regional Arabic arrowheads found from the period 100BC-150AD in the United Arab Emirates show the use of three-bladed broadheads, or trilobate arrowhead. "A trilobate arrowhead can be defined as an arrowhead that has three wings or blades that are usually placed at equal angles (i.e. c. 120°) around the imaginary longitudinal axis extending from the centre of the socket or tang. Since this type of arrowhead is rare in southeastern Arabia, we must investigate its origin and the reasons behind its presence at ed-Dur."[2]

[2]Dehue, Parsival. 2007. "Trilobate Arrowheads at Ed-Dur (U.A.E. Emirate of Umm Al-Qaiwain)". Arabian Archaeology and Epigraphy. 18, no. 2: 239-250.

Broadheads can be made from steel or other alloys, sometimes with hardened edges. Broadheads usually have two to four sharp blades that cause massive bleeding in the victim. Their function is to deliver a wide cutting edge so as to kill as quickly as possible.

They are expensive, damage most targets, and are usually not used for practice.[3]

[3]http://en.wikipedia.org/wiki/Arrowhead

There are two main types of broadheads used by hunters: The fixed-blade broadhead and the mechanical broadhead types. While the fixed-blade broadhead keeps its blades rigid and unmovable on the broadhead at ail times, the mechanical broadhead deploys its blades upon contact with the target, its blades swinging out to wound the target. A mechanical broadhead deploys its blades in-flight to increase lethality in hunting game. The mechanical head flies better because it is more streamlined, but has less penetration as it uses some of the kinetic energy in the arrow to deploy its blades.[4] Although not explicitly shown, it is contemplated that the disclosed skull stand 10 and method of displaying an animal skull 1 may be adapted for use with either a fixed-blade broadhead or a mechanical broadhead.

[4]"Mechanical vs. Fixed Broadheads". Huntingblades.com. Retrieved 2010-02-17.

It is contemplated that in the illustrative embodiment shown in the enclosed figures may be constructed of, but not limited to, any metal or combination of metals including bronze, steel and aluminum; plastics or carbon fiber including Kevlar®, foam-blown polyurethane, thermoplastic polyurethane, ethylene vinyl acetate, other polymers, other thermoplastics, carbon rubber, blown rubber polymers, composite materials, natural materials (e.g., rubber, leather, etc.), elastomers, combinations thereof, and/or any other material with suitable characteristics (e.g., compressive strength, stability, elasticity, density).

FIG. 1 provides a front view of one illustrative embodiment of an animal skull stand 10 wherein the animal skull 1 is that of an elk. As shown, the animal skull stand 10 is similar in design and style to an arrowhead 30, increased in size by 4-6 times.

Figure 2:
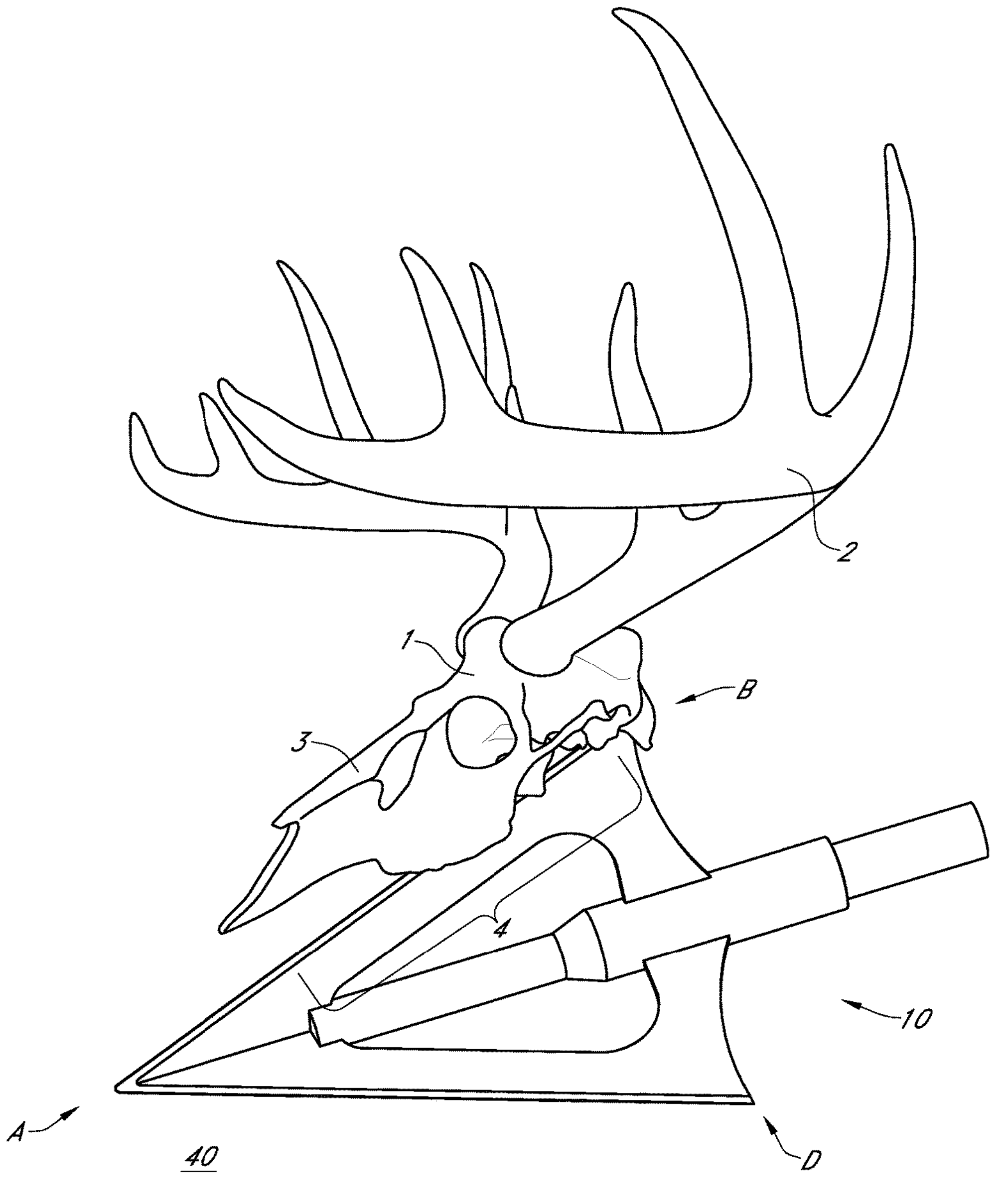
FIG. 2 provides a side view of the illustrative embodiment of an animal skull stand 10 herein with an animal skull 1 mounted therein.

FIG. 2 provides a side view of the illustrative embodiment of an animal skull stand 10. As shown, the animal skull stand 10 allows for dramatic display of the animal skull 1, including full unobstructed exposure of the face 3, jawline 4 and antlers 2. As shown, the lower jaw of the animal skull 1 has been fully removed allowing engagement between the interior of the upper jaw line 4 via the portion of the skull 1 wherein the roof of the mouth 5 resided and the lower side of the skull with the upper surface of the mounting edge 15. This allows for display of the antlers 2, the face 3, the jawline 4 and the teeth 6. Although not shown, one of ordinary skill will appreciate that the animal skull stand 10 may be placed on any surface 40 suitable for supporting the animal skull stand 10 including without limitation the ground (shown), a counter, a table or a wall. (not shown) Further, the animal skull stand 10 may be positioned on a turntable (aka Lazy Susan) allowing further display and inspection, without departure from the present disclosure. (not shown)

Figure 3:
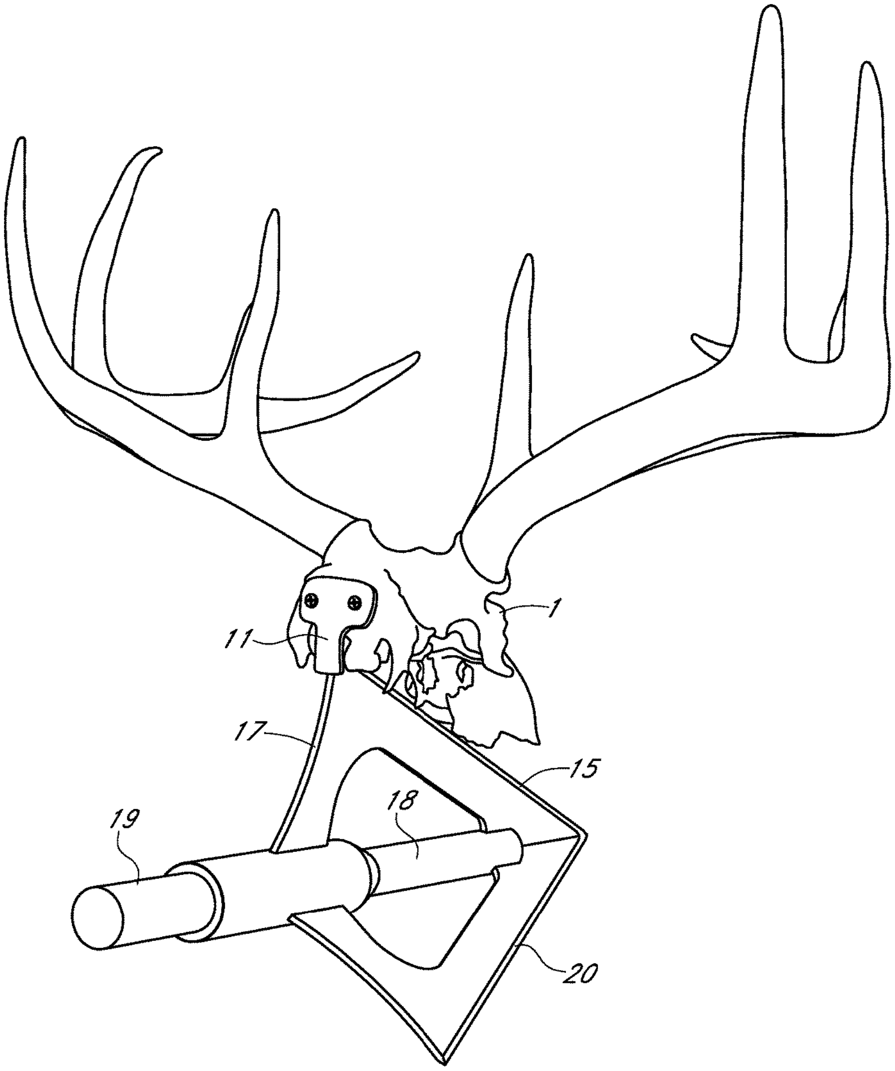
FIG. 3 provides a rear view of an illustrative embodiment of the animal skull stand 10 disclosed herein with an animal skull 1 mounted therein.
Figure 5:
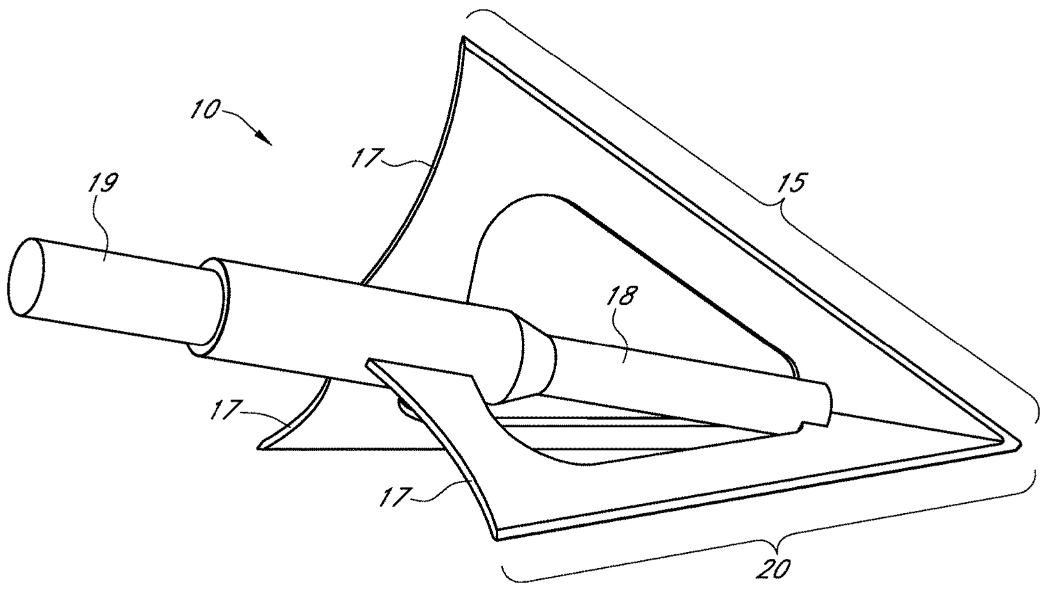
FIG. 5 is a side view, rear perspective of the animal skull stand 10 of the present disclosure shown herein prior to installation of the mounting tab 11.
Figure 5A:
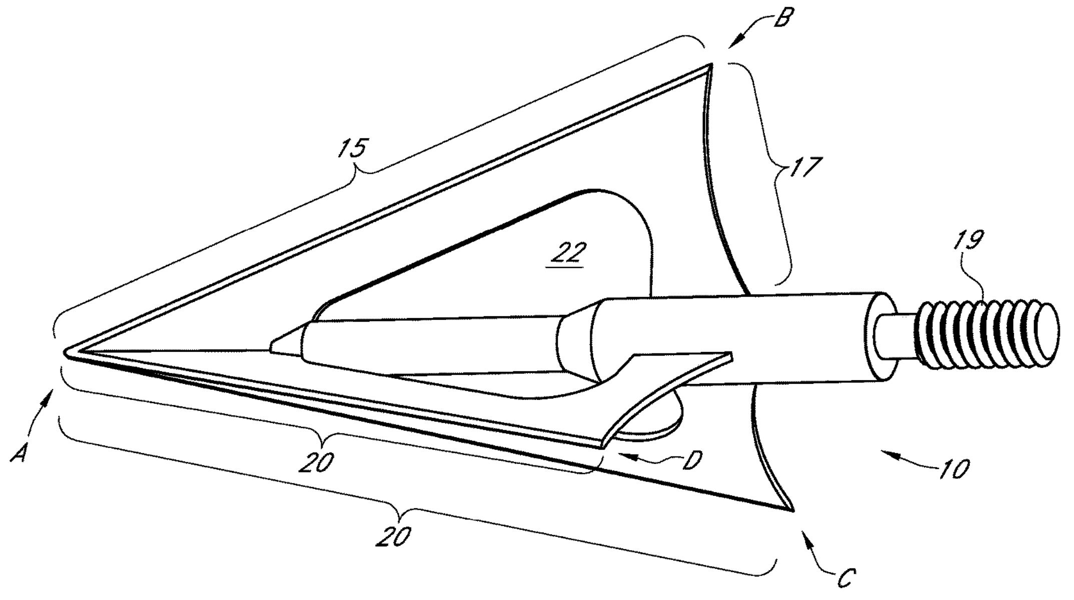
FIG. 5A is a left side perspective view of the animal skull stand 10 of the present disclosure shown having a threaded end.

FIG. 3 provides a rear view of an illustrative embodiment of the animal skull stand 10 disclosed herein. As shown, the stand 10 has a triangular shape similar to an arrowhead with three edges—a mounting edge 15 and a pair of support edges 20 which are in contact with the ground or other surface upon which the animal skull stand 10 rest. The generally angled nature of the mounting edge 15 allows for a unique and unobstructed display of the animal skull 1 as well as the animal skull stand 10 itself. The edges (15, 20) are positioned to encompass and are connected to a center body 18 which extends out past the back edges 17 of the animal skull stand 10. As called out in FIG. 2, the support edges 20 and the mounting edge 15 intersect and terminate at point A at their respective first ends. (See FIGS. 2 and 5) The mounting edge 15 second end terminates at point B. (See FIGS. 2 and 5) The first (right) support edge 20 terminates at a second end at point C. The second (left) support edge 20 ends at a second end at point D. (See FIGS. 2 and 5) Center body 18 extends out from the common point A is surrounded by mounting edge 15 and support edges 20. The back edges 17 extend at an angle from the center body 18 to attach to the second end of each of the mounting edge 15 and support edges 20 as shown in FIG. 5B. Voids 22 are formed between along the interior side of the mounting edge 15 and the support edges 20, in relation to the center body 18. See Appendix B herein for further disclosure and discussion on the fabrication of the various support and mounting edges to emulate an arrowhead.

As shown, the increase in size of the animal skull stand 10 in comparison to the actual arrowhead 30 (FIG. 6) used to bring down the animal from which the skull is procured provides for a dramatic view of the actual animal skull 1 mounted therein. Further, the creation of the skull stand 10 may allow immediate communication to the viewer of the arrowhead 30 used for the final hunt or kill, if the animal skull stand 10 is modeled after the arrowhead 30 used for the hunt or kill, therein communicating valuable and important information about the hunter and the hunt to the viewer. It is applicant's position that many hunters will see this as a valuable option for display and presentation of their trophy skull. See FIG. 8 for illustration of an embodiment of this disclosure for a personalized and customized skull stand 120. Further, as presented, the animal skull with antlers is shown in the European style vs. the traditional shoulder mount style as displayed in FIG. 9. Accordingly, the specific design, pattern, dimensions, and/or configuration of the stand 10, animal skull, with antlers or without, European or shoulder style mount, in no way limit the scope of the skull stand 10 for display of an animal skull unless so indicated in the following claims.

Figure 3A:
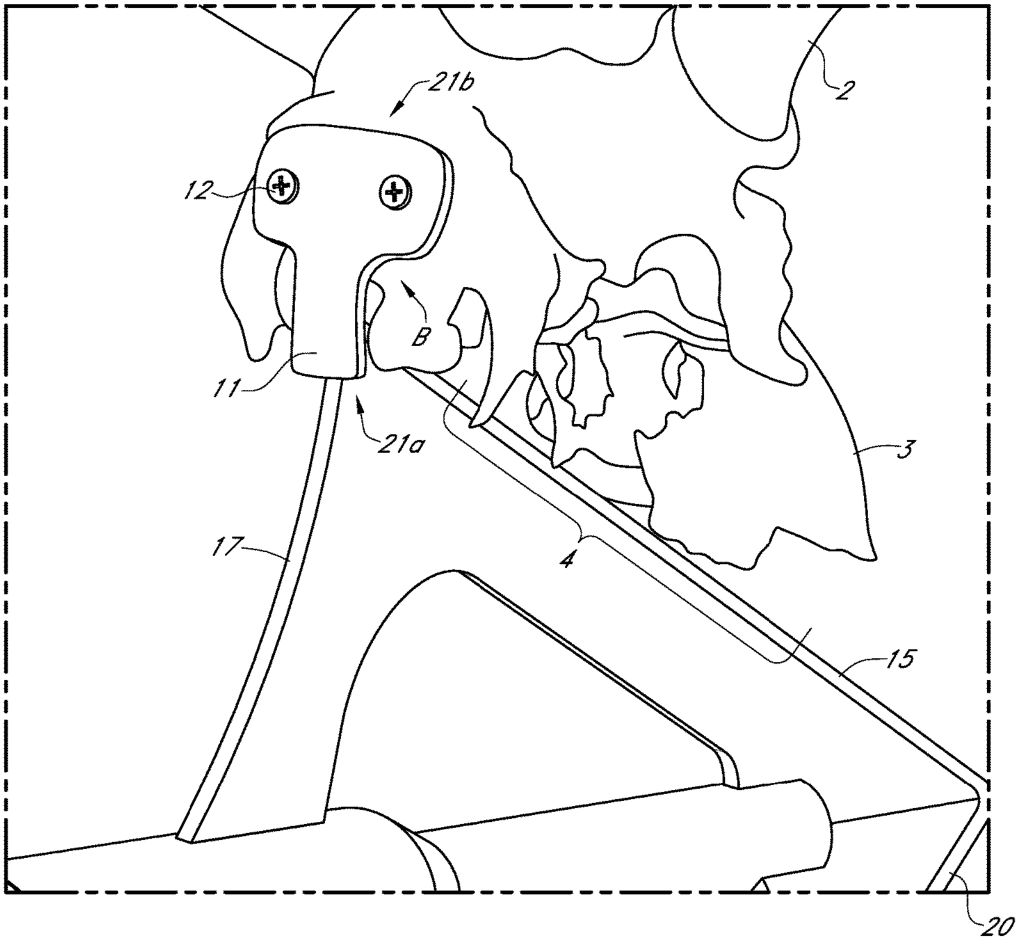
FIG. 3A provides a detailed view of FIG. 3 illustrating one illustrative embodiment of a tab 11 positioned at the end of a portion of one mounting edge 15 of the stand 10 which may be used with various embodiments of the animal skull stand 10 disclosed herein.

FIG. 3A provides a detailed view of FIG. 3 illustrating one illustrative embodiment of a tab 10 positioned at the end of an one mounting edge portion of the stand 10 which may be used with various embodiments of the animal skull stand disclosed herein. As shown, the tab 11 has been attached at the back edge 17 of the mounting edge 15. In this embodiment, the tab 11 was welded to the back edge 17. As shown, the tab 11 is approximately 2.5 inches tall and 1.5 inches wide at its widest portion and 0.75 inches wide at its narrowest portion. The tab 11 has a tear drop type shape with a smaller dimension at the attachment point of the mounting edge 15, having a dimension slightly wider than the dimension of the mounting edge 15 and back edge 17, then expanding in size at the point of attachment to the rear of the animal skull. As shown, the tab 11 has two apertures positioned in the upper wider portion allowing insertion of fasteners 12, in this case self-tapping screws, to be inserted therein through the tab 11 for direct attachment to the animal skull displayed. In the embodiment of the animal skull stand shown at FIGS. 1-5, the fastener has a generally tear drop shape wherein the lower portion is attached to the animal skull stand 10 at a point (B) proximate wherein the back edge 17 meets mounting edge 15. In one illustrative embodiment, the tab 11 is narrower at the tab attachment point (21*a*) than at the skull attachment point (21*b*) so as to not impede the view of animal skull 1 and improves the stability of the mount.

One of ordinary skill will appreciate that without limitation, other types of fasteners may be used, with the present disclosure including nails, doles, glues, adhesives, clips, wires and combinations/therein. Further, although not shown, the present disclosure may be enabled with a tab 11 that attaches to the support edges 20 and/or center body 18, without attachment to the back side or edge 17 of the support edge 20 as shown, without departure from the present disclosure. The specific pattern, dimensions, configuration, etc. of the features of the tab 11 may vary from one embodiment of the animal skull stand 10 to the next and are therefore in no way limiting to the scope of the skull stand 10 unless so indicated in the following claims.

Figure 4:
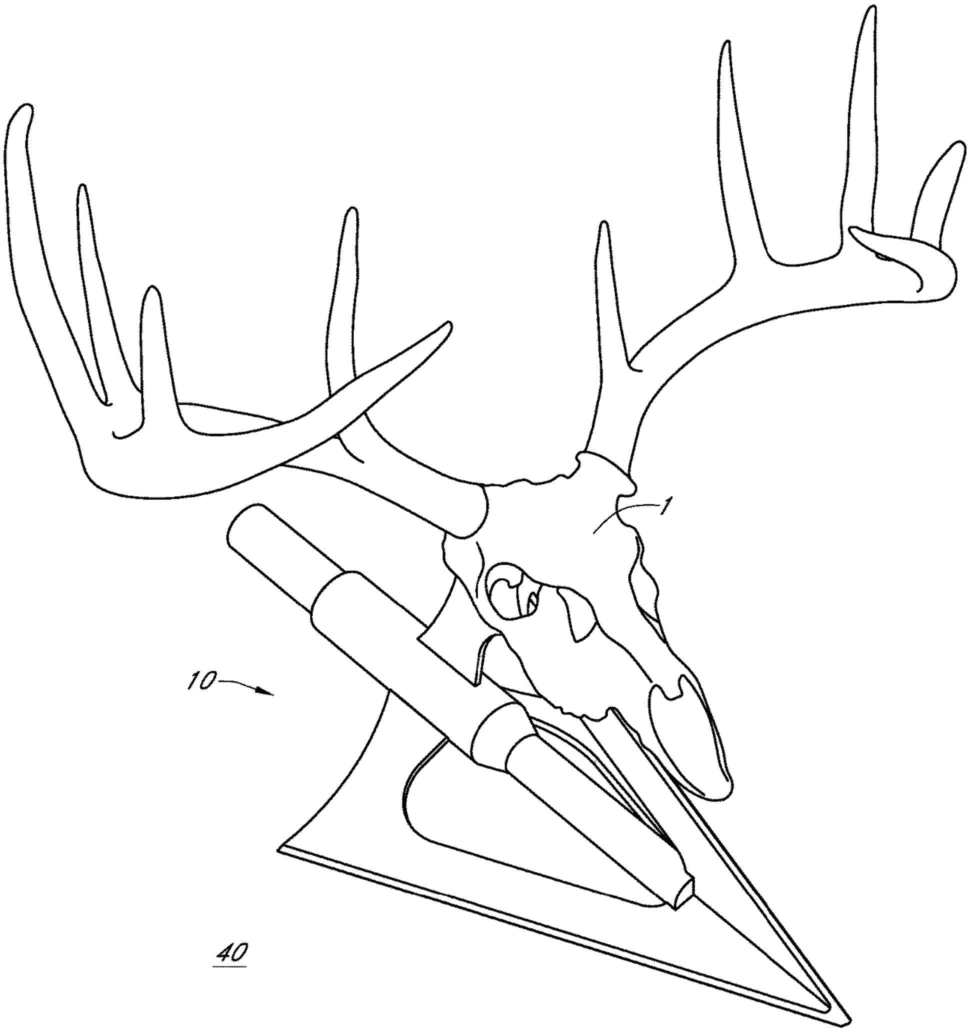
FIG. 4 provides a perspective view of one illustrative embodiment of an animal skull stand 10 wherein the animal skull 1 is that of a deer.

FIG. 4 provides a perspective view of one illustrative embodiment of an animal skull stand 10 wherein the animal skull 1 is that of a elk instead of an deer as shown in FIGS. 1-3. One of ordinary skill will appreciate that the selection of the animal to be displayed in no way limits the scope of the skull stand 10, unless so indicated in the following claims, as any animal may be displayed using the animal skull stand 10. Further, the animal skull 1 selected for display may have horns or antlers, or may not have horns or antlers, and therefore inclusion of antlers 2 in the preceding figures in no way limit the scope of the skull stand 10 unless so indicated in the following claims.

FIG. 5 is a side view, rear perspective of the animal skull stand 10 of the present disclosure shown herein prior to installation of the mounting tab 11. The animal skull stand 10 has a total length of 50 inches. Approximately 12 inches of that length extend beyond the rear portion of the mounting edge 15 and the support edges 20. The portion of the center body 18 extending beyond the terminus of the mounting edge(s) 15 and the support edges 20 at back edges 17 is defined as the ornamental tail 19. As shown in FIG. 5B, this portion may be threaded or non-threaded as shown in FIG. 1-5A.

As shown, the mounting and support edges (15, 20) are symmetrical and equal in all other dimensions. The mounting edge 15 is positioned as shown and is approximately 36 inches in length. It is defined as the edge selected to engage and position the animal skull 1. Support edge(s) 20 are defined as the edge(s) selected to engage with and support the stand 10 against a surface 40. As shown, the mounting and support edges (15, 20) are attached to and positioned around a center body 18 which is positioned interior of the length of the edges (15, 20). An ornamental tail 19 extends away from the center body 18 and is generally shaped like the tail of an arrowhead 30. It should be understood that the animal skull stand 10 may be manufactured as one integral component such that the mounting edge 15, support edges 20, center body 18, and ornamental tail 19 may be engaged with one another during the manufacturing process and/or such that the demarcation between the various components is not easily detected. Exemplary methods of production/fabrication could include casting and welding.

Accordingly, the specific pattern, dimensions, and/or configuration of the stand 10, tab 11, fastener(s) 12, mounting edge 15, back edge 17, center body 18, ornamental tail 19 and support edge 20 in no way limit the scope of the animal skull stand 10 and method of display unless so indicated in the following claims.

The various elements of the skull stand 10 may be separately formed and later engaged with one another (e.g., via mechanical fasteners, material fusing, chemical adhesives, etc.) or integrally formed with one another. The materials used to construct the skull stand 10 and various elements thereof will vary depending on the specific application of the skull stand 10, but it is contemplated that steel, aluminium, polymers, other synthetic materials, natural materials, and/or combinations thereof will be especially useful for some applications. Accordingly, the above-referenced elements may be constructed of any material known to those skilled in the art or later developed, which material is appropriate for the specific application of the skull stand 10, without departing from the spirit and scope of the skull stand 10 as disclosed and claimed herein.

Figure 6:
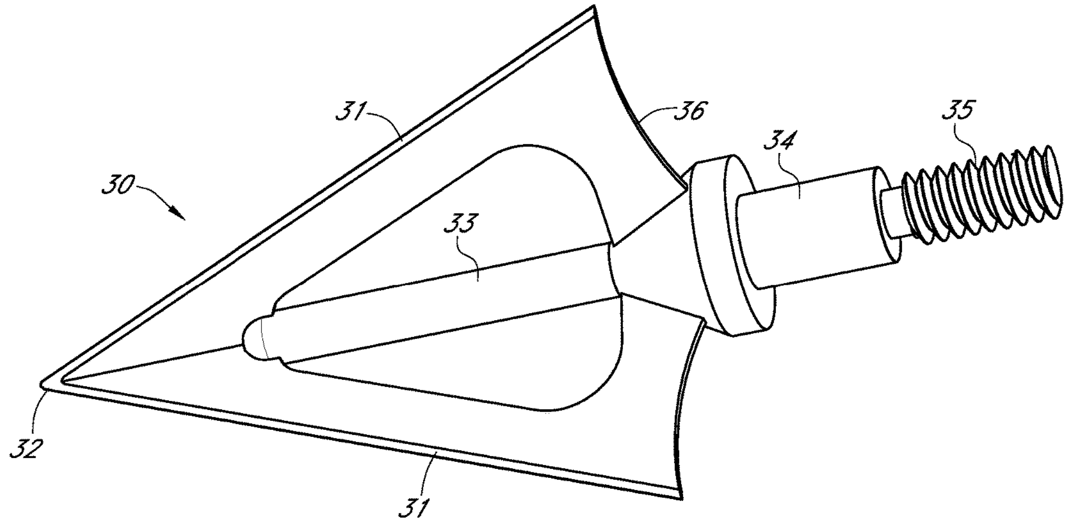
FIG. 6 provides a side view of an illustrative arrowhead (illustrated as a broadhead) for attachment to an arrow for use in hunting. As shown, the animal skull stand 10 was constructed to emulate the particular broadhead point used to hunt the animal represented by the skull 1 to be mounted thereon.

FIG. 6 provides a side view of an illustrative arrowhead (illustrated as a broadhead) for attachment to an arrow for use in hunting. As shown, the animal skull stand 10 was constructed to emulate the particular broadhead point used to hunt the animal represented by the skull 1 to be mounted thereon. As shown, the arrowhead (also known as broadhead, field or game point, without limitation) 30 is comprised of three (3) angled blades 31 intersecting to terminate at a anterior tip 32 and having sharp exterior edges, positioned around and supported by a center 33 having a tail 34 extending in-line and away from tip 32 terminating at a connection point 35. A back edge 36 is formed on the posterior of the angled blades 31 for intersection and attachment to the center 33. The present disclosure mounting stand 10 as modeled based on the arrowhead 30 as illustrated at FIG. 6. As shown, the arrowhead 30 is 2.25 inches long having an angled bladed 31 with a length of 1.5 inches with a tail portion 34 having a length of 0.5 inches and connection portion 35 measuring 0.313 inches in length. Accordingly, the specific dimensions, configuration, and/or other features of the arrowhead 30 may vary from one embodiment to the next, and are therefore in no way limiting to the scope of the present disclosure.

Figure 7:
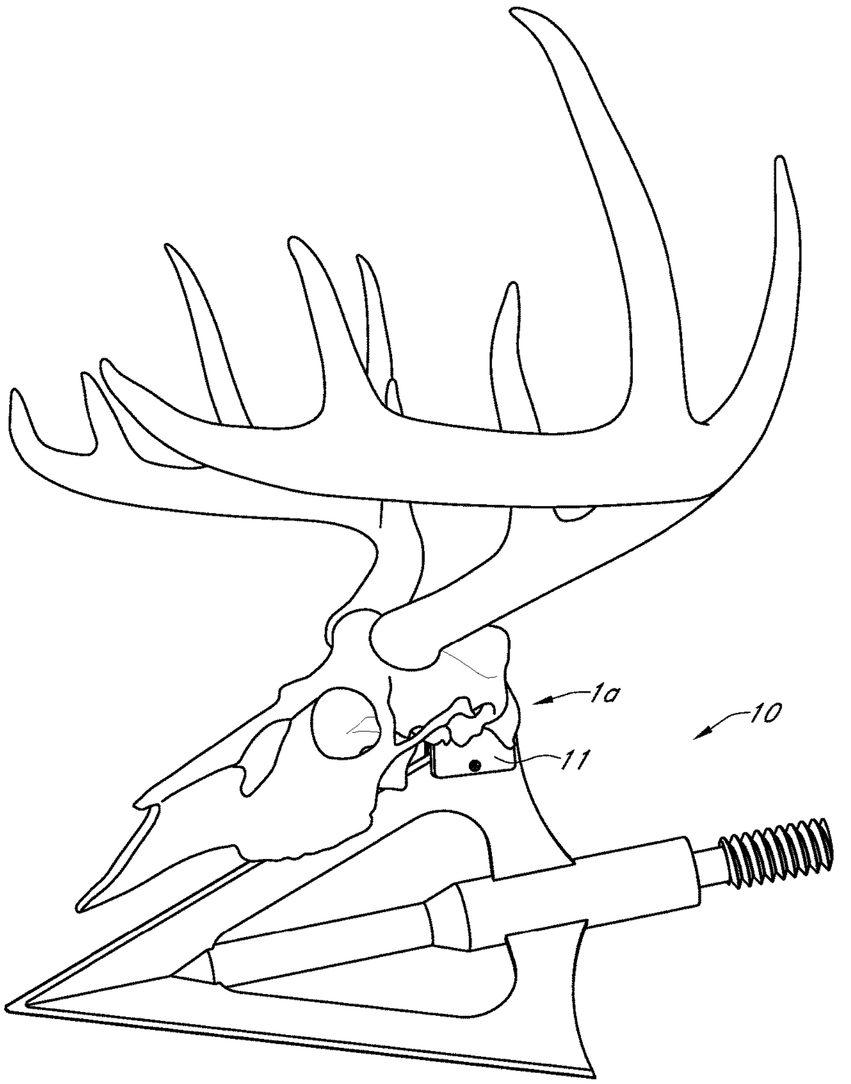
FIG. 7 is a side view of an embodiment of the present disclosure wherein upper portion of the mouth of the animal's skull is positioned on the mounting edge 15 with tab 11. positioned between the rear portion of the mounting edge the animal skull for attachment.
Figure 7A:
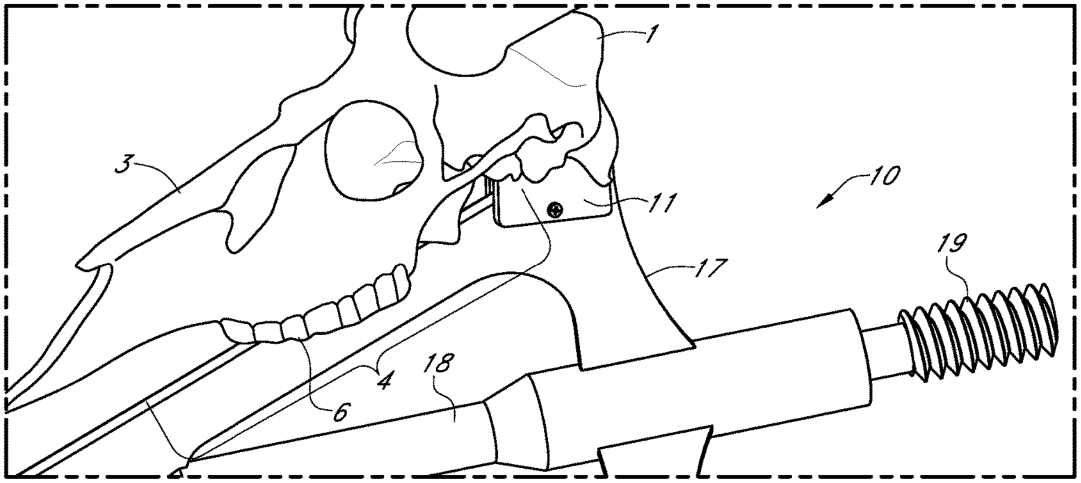
FIG. 7A is a detailed view of the mounting edge and the tab of FIG. 7.

FIG. 7 is a side view of an embodiment of the present disclosure wherein the upper portion of the mouth 5 of the animal's skull 1 is positioned on the mounting edge 15 with tab 11. As shown in detail in FIG. 7A, the tab 11 in this embodiment is positioned on the mounting edge 15 for engagement with underside of the animal skull 1.

Figure 8:
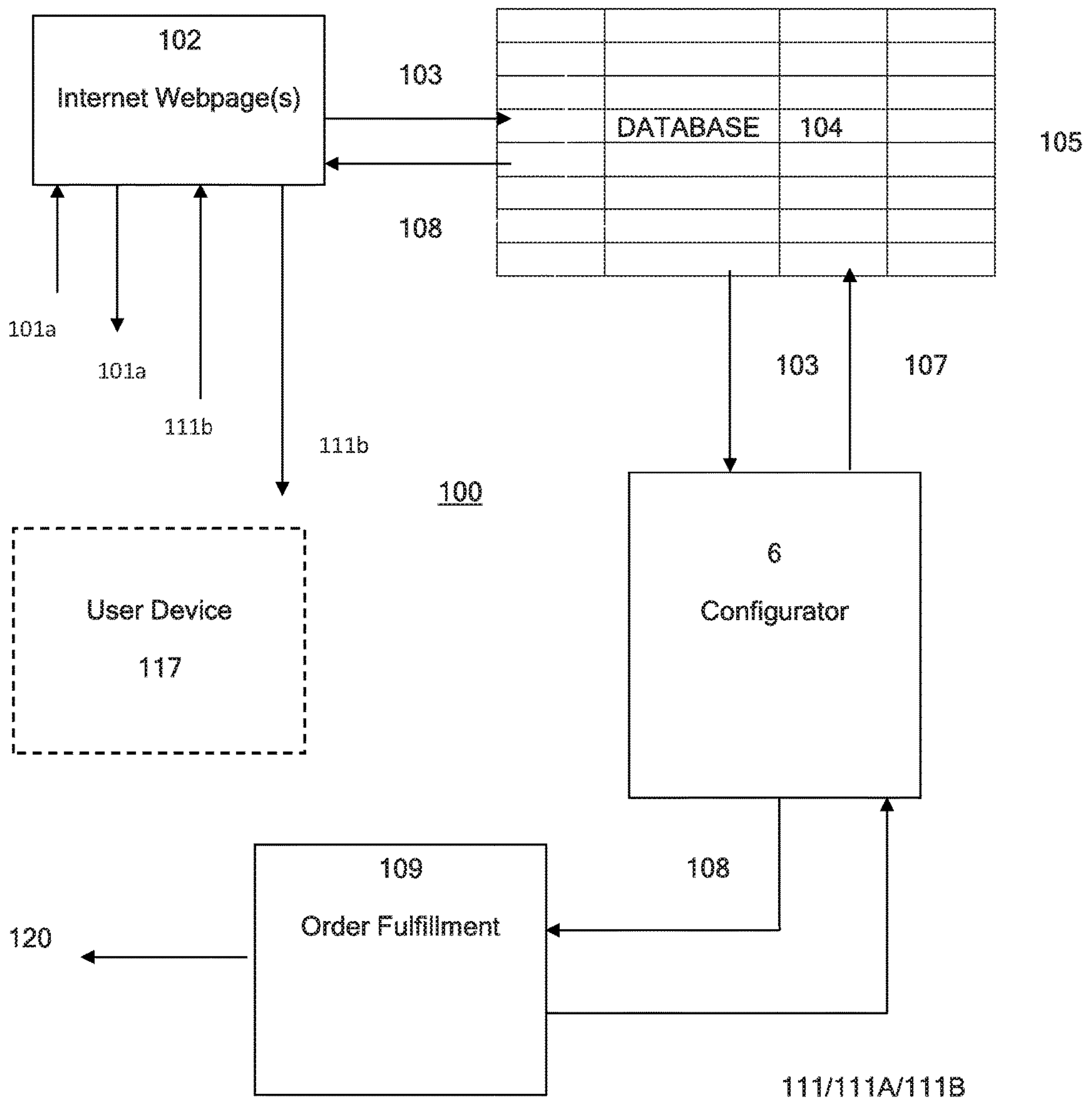
FIG. 8 is an exemplary embodiment of how an internet website could function based on user preferences and selections to create a personalized and customized animal skull stand 120 incorporating input from the user and various embodiments represented by Appendix A.
Figure 9:
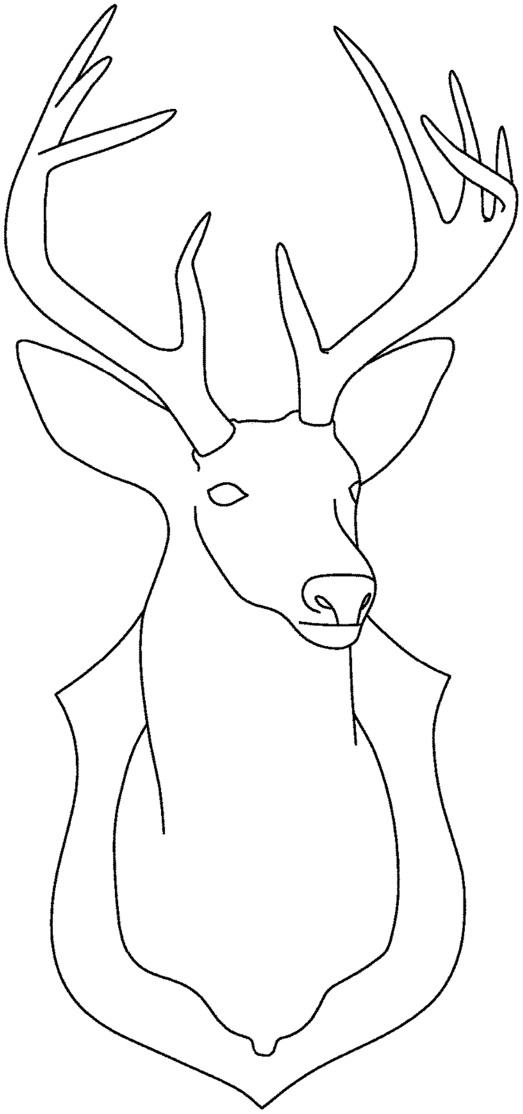
FIG. 9 (PRIOR ART)
FIG. 9 is an exemplary embodiment of a shoulder type mount for display of an animal head or skull as is commonly known in the prior art.

FIG. 8 is an exemplary embodiment of how an internet website could function based on user preferences and selections to produce a personalized and customized animal skull stand 120 incorporating input from the user and various embodiments represented by Appendix A. As shown in FIG. 8, a customized animal stand 120 may be accessed by consumers by a system for collecting user input and requests for producing a customized animal skull stand 120 for consumers via a network system, such as an internet webpage. (Not shown) The system as disclosed allows a user to select from a multitude of inputs (arrowhead type, animal, mounting style, etc.) allowing selection and production of a personalized and customized animal skull stand 120.

FIG. 8 provides an exemplary illustration of how one embodiment of the present disclosure may be enabled. A animal skull stand 10 customization system 110 allows a consumer to access an internet webpage 102 (not shown), with a user device 117, including a computer or smart phone, to provide consumer input (information) 101 and answer questions related to the stand 10 desired including for example but without limitation, the broadhead 30 used and the animal hunted 116 (See Appendix A) and type of mounting they would like 115 (European, traditional, antlers, no antlers), and receive system suggestions (111*a*, 111*b*, etc.) on the type of stand and its properties. Additionally, the consumer can select various finishes or materials (111*d*) and aesthetics appearances—rough, smooth, cast, welded. The consumer input 101 is collected and converted to data 103. Additionally, the stand customization system 110 may provide suggestions as to a finish type (111*c*) for the stand product or prompt the consumer to supply additional information about the hunt including the name of the product used, the name of the hunter, the date of the hunt (111*c*) for the customized stand product 120.

This data 103 is collected and arranged in a database 104 and may reside on a computer or specialized, dedicated server 105 (not shown). An evaluator/predictor module 118 may also reside also on server 105 or may reside on a 2$^{nd}$ server 105*a* or combination of a network of dedicated servers (not shown). The evaluator/predictor model 118 processes the consumer input 101 and is converted to data 103 for a particular consumer, makes calculations and then produces calculated results 107 which may be then be used in an iterative process for additional calculations useful in predicting a particular animal skull mounting stand 10 the consumer may enjoy based on the evaluation of the converted data 103 and based on consumer input 101 collected. The consumer input 101 (collectively, individually 101*a*, 101*b*, 101*c*, etc.) may include any one or more of the following, or as found in Appendix A, all incorporated by reference herein, without limitation, as is useful in evaluating/predicting mounting stands 10 desirable to a consumer.

Having described the preferred embodiments, other features of the animal skull stand 10 will undoubtedly occur to those versed in the art, as will numerous modifications and alterations in the embodiments as illustrated herein, all of which may be achieved without departing from the spirit and scope of the animal skull stand 10 disclosed herein. Accordingly, the methods and embodiments pictured and described herein are for illustrative purposes only, and the scope of the present disclosure extends to all method and/or structures for providing increased functionality, comfort, longevity, enjoyment and aesthetics in the display of animal skulls and/or antlers. Furthermore, the methods and embodiments pictured and described herein are no way limiting to the scope of the skull stand 10 and method unless so stated in the following claims.

It should be noted that the skull stand 10 is not limited to the specific embodiments pictured and described herein, but is intended to apply to all similar apparatuses and methods for providing the various benefits and/or features of a skull stand 10. Modifications and alterations from the described embodiments will occur to those skilled in the art without departure from the spirit and scope of the skull stand 10. It is understood that the skull stand 10 as disclosed herein extends to all alternative combinations of one or more of the individual features mentioned, evident from the text and/or drawings, and/or inherently disclosed. All of these different combinations constitute various alternative aspects of the skull stand 10 and/or components thereof. The embodiments described herein explain the best modes known for practicing the skull stand 10 and/or components thereof and will enable others skilled in the art to utilize the same. The claims are to be construed to include alternative embodiments to the extent permitted by the prior art.

While the skull stand 10 has been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including but not limited to: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as illustrative only, with a true scope and spirit being indicated by the following claims.

What is claimed is:

1. A stand for display of an animal skull comprising:

a) a first support edge having a first and a second end;

b) a second support edge having a first and a second end;

c) a mounting edge having a first and a second end;

d) a center body having a first and a second end, wherein the first support edge, the second support edge and the mounting edge are positioned around the center body, wherein the support edges and the mounting edges are equal in length, wherein the first end of each of the mounting edge, the support edges intersect and terminate at a common point;

e) a first back edge having a first and a second end, wherein the first end of the first back edge connects to the center body and the second end of the first back edge connects to the mounting edge;

f) a second back edge having a first and a second end, wherein the first end of the second back edge connects to the center body and the second end of the second back edge connects to the first support edge;

g) a third back edge having a first and a second end, wherein the first end of the third back edge connects to the center body and the second end of the third back edge connects to the second support edge; and, h) a tab having a first and second end is affixed at the first end to the mounting edge proximate the connection between the first back edge and the mounting the edge wherein the second end of the tab is suitable for connection to a posterior portion of an animal skull for display therein.

2. The stand for display of the animal skull according to claim 1 wherein at least one aperture is positioned in the second end of the tab for insertion of a fastener for fixed connection to a processed animal skull for display of the processed animal skull.

3. The stand for display of the animal skull according to claim 1 wherein the first support edge, the second support edge and the mounting edge are equidistant apart around a longitudinal axis extending from the center body.

4. The stand for display of the animal skull according to claim 1 wherein the first support edge, the second support edge and the mounting edge are substantially equal in length.

5. The stand for display of the animal skull according to claim 1 wherein a tab is affixed to the back edge connecting the mounting edge to the center body.

6. The stand for display of the animal skull according to claim 1 wherein the tab is not affixed to either the back edge connecting the mounting edge to the center body or the mounting edge.

7. A method of displaying an animal skull comprising the steps of:

a) selecting an arrowhead for hunting an animal;

b) hunting the animal with the arrowhead and killing the animal;

c) processing the animal killed for presentation of the skull;

d) affixing the processed skull to an animal skull stand selected to emulate the arrowhead selected to hunt the animal;

e) wherein the processed skull is affixed to the animal stand via a tab which is engaged with the stand and affixable to the processed skull.

8. The method of displaying an animal skull according to claim 7 further comprising the step of configuring the stand such that it is comprised of:

a) a first support edge having a first and a second end;

b) a second support edge having a first and a second end;

c) a mounting edge having a first and a second end;

d) a center body having a first and a second end, wherein the first support edge, the second support edge and the mounting edge are positioned around the center body, wherein the support edges and the mounting edges are equal in length, wherein the first end of each of the mounting edge, the support edges intersect and terminate at a common point;

e) a first back edge having a first and a second end, wherein the first end of the first back edge connects to the center body and the second end of the first back edge connects to the mounting edge;

f) a second back edge having a first and a second end, wherein the first end of the second back edge connects to the center body and the second end of the second back edge connects to the first support edge;

g) a third back edge having a first and a second end, wherein the first end of the third back edge connects to the center body and the second end of the third back edge connects to the second support edge; and, h) a tab having a first and second end is affixed at the first end to the mounting edge proximate the connection between the first back edge and the mounting the edge wherein the second end of the tab is suitable for connection to the posterior portion of an animal skull for display therein.

9. The method of displaying the animal skull according to claim 8 further comprising the step of configuring the stand such that at least one aperture is positioned in the second end of the tab for insertion of a fastener for fixed connection to a processed animal skull for display of the processed animal skull.

10. The method of displaying the animal skull according to claim 8 further comprising the step of configuring the stand such that the first support edge, the second support edge and the mounting edge are equidistant apart around a longitudinal axis extending from the center body.

11. The method of displaying the animal skull according to claim 8 further comprising the step of configuring the stand such that the first support edge, the second support edge and the mounting edge are substantially equal in length.

12. The method of displaying the animal skull according to claim 8 further comprising the step of configuring the stand such that the tab is affixed to the back edge connecting the mounting edge to the center body.

13. The method of displaying the animal skull according to claim 8 further comprising the step of configuring the stand such that the tab is not affixed to either the back edge connecting the mounting edge to the center body or the mounting edge.

* * * * *